United States Patent [19]
Moisin et al.

[11] Patent Number: 5,686,799
[45] Date of Patent: Nov. 11, 1997

[54] BALLAST CIRCUIT FOR COMPACT FLUORESCENT LAMP

[75] Inventors: Mihail Moisin, Lake Forest, Ill.; Mark E. Martich, Hanover, Mass.

[73] Assignee: Pacific Scientific Company, Weymouth, Mass.

[21] Appl. No.: 690,456

[22] Filed: Aug. 8, 1996

Related U.S. Application Data

[63] Continuation of Ser. No. 302,422, Sep. 8, 1994, abandoned, which is a continuation-in-part of Ser. No. 217,936, Mar. 25, 1994, abandoned, and Ser. No. 237,850, May 3, 1994.

[51] Int. Cl.[6] .................................................. G05F 1/00
[52] U.S. Cl. .......................... 315/307; 315/311; 315/291; 315/DIG. 4
[58] Field of Search ................................. 315/307, 291, 315/308, 311, 200 R, DIG. 4

[56] References Cited

U.S. PATENT DOCUMENTS

| | | | |
|---|---|---|---|
| 2,505,112 | 4/1950 | Hallman | 173/328 |
| 2,966,602 | 12/1960 | Waymouth et al. | 313/44 |
| 2,966,609 | 12/1960 | Turner | 315/3.5 |

(List continued on next page.)

FOREIGN PATENT DOCUMENTS

| | | |
|---|---|---|
| 0 114 370 A1 | 8/1984 | European Pat. Off. . |
| 0 127 101 A1 | 12/1984 | European Pat. Off. . |
| 0 239 863 A1 | 10/1987 | European Pat. Off. . |
| 0 259 646 A1 | 3/1988 | European Pat. Off. . |
| 0 395 776 A1 | 11/1990 | European Pat. Off. . |
| 0 441 253 A1 | 8/1991 | European Pat. Off. . |
| 3437554A1 | 4/1986 | Germany . |
| 3632272A1 | 4/1988 | Germany . |
| 3813672A1 | 11/1988 | Germany . |
| 655042 | 3/1979 | U.S.S.R. . |
| WO 90/00830 | 1/1990 | WIPO . |
| WO 90/09729 | 8/1990 | WIPO . |
| WO 93/09649 | 5/1993 | WIPO . |
| WO 94/27420 | 11/1994 | WIPO . |

OTHER PUBLICATIONS

Portions of Catalog—Philips Lighting, "Lamp Specification and Application Guide," Cover Page, Back Page, pp. 11, 61–64, 78 (May 1993).
Catalog—Osram, "Osram Delux®, Compact Fluorescent Lamps," pp. 1–15 (Jul. 1993).
W. Hayt et al., *Engineering Circuit Analysis*, Third Edition, (McGraw–Hill Book Company) pp. 296–297, 1978. (no month available).
A. Kröning et al., "New Electronic Control Gear" *Siemens Power Engineering & Automation VII*, pp. 102–104, 1985. (no month available).
Osram Dulux® compact fluorescent lamps, "Economical long–life lighting—with extra convenience of electronic control gear", pp. 1–15 (dated a year before Applicants' invention).
Philips Lighting "Lamp Specification and Application Guide", pp. 1, 11, 61–64, and 78 (dated a year before Applicants' invention).

*Primary Examiner*—Frank G. Font
*Assistant Examiner*—Reginald A. Ratliff
*Attorney, Agent, or Firm*—Lahive & Cockfield, LLP

[57] ABSTRACT

A compact dimmable fluorescent lamp apparatus that connects with at least one fluorescent lamp and with an input power source that supplies an AC input voltage. The lamp includes a rectification stage for rectifying the AC input voltage, a dimming stage for generating a dimming signal indicative of lamp brightness, and a ballast circuit that is in electrical communication with the rectification stage and the dimming stage. The ballast circuit is arranged for connection with the lamp for applying power variably to the lamp and includes a resonant circuit stage that electrically connects with the lamp and that generates a high frequency voltage in response to the input voltage. The resonant circuit varies the level of power supplied to the lamp in response to the dimming signal, thereby attaining a selected level of lamp brightness. The ballast circuit also includes a voltage feedback element in electrical series with the lamp for generating a selected high frequency voltage signal and for applying this signal to the rectification stage. The feedback element superimposes the ballast circuit high frequency voltage signal over the input voltage.

32 Claims, 4 Drawing Sheets

U.S. PATENT DOCUMENTS

| | | | |
|---|---|---|---|
| 3,112,890 | 12/1963 | Snelling | 240/51.11 |
| 3,517,259 | 6/1970 | Dotto | 315/200 |
| 3,569,817 | 3/1971 | Boehringer | 321/2 |
| 3,611,021 | 10/1971 | Wallace | 315/239 |
| 3,736,496 | 5/1973 | Lachocki | 323/22 T |
| 3,882,356 | 5/1975 | Stehlin | 315/205 |
| 3,913,000 | 10/1975 | Cardwell, Jr. | 321/2 |
| 3,965,345 | 6/1976 | Fordsmand | 240/47 |
| 3,974,418 | 8/1976 | Fridrich | 315/59 |
| 4,005,334 | 1/1977 | Andrews | 315/208 |
| 4,016,451 | 4/1977 | Engel | 315/158 |
| 4,053,813 | 10/1977 | Kornrumpf et al. | 315/206 |
| 4,125,767 | 11/1978 | Silver | 250/214 D |
| 4,127,795 | 11/1978 | Knoll | 315/210 |
| 4,127,798 | 11/1978 | Anderson | 315/209 R |
| 4,135,116 | 1/1979 | Smith | 315/158 |
| 4,160,288 | 7/1979 | Stuart et al. | 363/41 |
| 4,168,453 | 9/1979 | Gerhard et al. | 315/225 |
| 4,230,971 | 10/1980 | Gerhard et al. | 315/307 |
| 4,237,403 | 12/1980 | Davis | 315/98 |
| 4,245,285 | 1/1981 | Weiss | 363/17 |
| 4,284,925 | 8/1981 | Bessone et al. | 315/240 |
| 4,348,615 | 9/1982 | Garrison et al. | 315/219 |
| 4,350,891 | 9/1982 | Wuerflein | 378/110 |
| 4,353,009 | 10/1982 | Knoll | 315/220 |
| 4,370,600 | 1/1983 | Zansky | 315/244 |
| 4,379,254 | 4/1983 | Hurban | 315/291 |
| 4,388,563 | 6/1983 | Hyltin | 315/205 |
| 4,392,087 | 7/1983 | Zansky | 315/219 |
| 4,393,323 | 7/1983 | Hübner | 313/110 |
| 4,395,660 | 7/1983 | Waszkiewicz | 315/291 |
| 4,399,391 | 8/1983 | Hammer et al. | 315/244 |
| 4,423,348 | 12/1983 | Greiler | 313/113 |
| 4,443,740 | 4/1984 | Goralnik | 315/284 |
| 4,481,460 | 11/1984 | Kröning et al. | 323/266 |
| 4,510,400 | 4/1985 | Kiteley | 307/66 |
| 4,523,131 | 6/1985 | Zansky | 315/307 |
| 4,533,986 | 8/1985 | Jones | 363/17 |
| 4,544,863 | 10/1985 | Hashimoto | 315/209 R |
| 4,547,706 | 10/1985 | Krummel | 315/226 |
| 4,562,383 | 12/1985 | Kerscher et al. | 315/225 |
| 4,580,080 | 4/1986 | Smith | 315/199 |
| 4,612,479 | 9/1986 | Zansky | 315/194 |
| 4,613,934 | 9/1986 | Pacholok | 363/131 |
| 4,616,158 | 10/1986 | Krummel et al. | 315/225 |
| 4,620,271 | 10/1986 | Musil | 363/21 |
| 4,626,746 | 12/1986 | Zaderej | 315/208 |
| 4,631,450 | 12/1986 | Lagree et al. | 315/244 |
| 4,641,061 | 2/1987 | Munson | 315/210 |
| 4,647,817 | 3/1987 | Fähnrich et al. | 315/104 |
| 4,651,060 | 3/1987 | Clark | 315/199 |
| 4,677,345 | 6/1987 | Nilssen | 315/209 |
| 4,682,083 | 7/1987 | Alley | 315/307 |
| 4,683,402 | 7/1987 | Aubrey | 315/56 |
| 4,700,113 | 10/1987 | Stupp et al. | 315/224 |
| 4,730,147 | 3/1988 | Kroening | 315/100 |
| 4,739,227 | 4/1988 | Anderson | 315/260 |
| 4,742,535 | 5/1988 | Hino et al. | 378/105 |
| 4,743,835 | 5/1988 | Bossé et al. | 323/266 |
| 4,857,806 | 8/1989 | Nilssen | 315/72 |
| 4,859,914 | 8/1989 | Summa | 315/354 |
| 4,864,482 | 9/1989 | Quazi et al. | 363/37 |
| 4,894,587 | 1/1990 | Jungreis et al. | 315/200 |
| 4,933,605 | 6/1990 | Quazi et al. | 315/224 |
| 4,949,020 | 8/1990 | Warren et al. | 315/297 |
| 4,950,963 | 8/1990 | Sievers | 315/360 |
| 4,954,768 | 9/1990 | Luchaco et al. | 323/300 |
| 4,988,921 | 1/1991 | Ratner et al. | 315/159 |
| 4,996,462 | 2/1991 | Krummel | 315/209 R |
| 4,999,547 | 3/1991 | Ottenstein | 315/307 |
| 5,001,386 | 3/1991 | Sullivan et al. | 315/219 |
| 5,003,230 | 3/1991 | Wong et al. | 315/279 |
| 5,004,959 | 4/1991 | Nilssen | 315/291 |
| 5,004,972 | 4/1991 | Roth | 323/320 |
| 5,039,914 | 8/1991 | Szuba | 315/158 |
| 5,041,763 | 8/1991 | Sullivan et al. | 315/176 |
| 5,083,081 | 1/1992 | Barrault et al. | 324/126 |
| 5,084,653 | 1/1992 | Nilssen | 315/219 |
| 5,089,751 | 2/1992 | Wong et al. | 315/279 |
| 5,097,181 | 3/1992 | Kakitani | 315/209 |
| 5,172,033 | 12/1992 | Smits | 315/224 |
| 5,172,034 | 12/1992 | Brinkerhoff | 315/307 |
| 5,173,643 | 12/1992 | Sullivan et al. | 315/276 |
| 5,174,646 | 12/1992 | Siminovitch et al. | 362/218 |
| 5,175,477 | 12/1992 | Grissom | 315/291 |
| 5,185,560 | 2/1993 | Nilssen | 315/219 |
| 5,192,896 | 3/1993 | Quin | 315/224 |
| 5,194,782 | 3/1993 | Richardson et al. | 315/291 |
| 5,198,726 | 3/1993 | Van Meurs et al. | 315/224 |
| 5,214,356 | 5/1993 | Nilssen | 315/224 |
| 5,233,270 | 8/1993 | Nilssen | 315/58 |
| 5,237,243 | 8/1993 | Chung | 315/219 |
| 5,245,253 | 9/1993 | Quazi | 315/224 |
| 5,289,079 | 2/1994 | Wittmann | 313/318 |
| 5,289,083 | 2/1994 | Quazi | 315/224 |
| 5,296,783 | 3/1994 | Fischer | 315/64 |
| 5,309,062 | 5/1994 | Perkins et al. | 315/53 |
| 5,313,142 | 5/1994 | Wong | 315/205 |
| 5,321,337 | 6/1994 | Hsu | 315/219 |
| 5,331,253 | 7/1994 | Counts | 315/209 R |
| 5,341,067 | 8/1994 | Nilssen | 315/209 R |
| 5,394,064 | 2/1995 | Ranganath et al. | 315/209 R |
| 5,396,154 | 3/1995 | Shiy et al. | 315/291 |
| 5,396,155 | 3/1995 | Bezdon et al. | 315/291 |
| 5,404,082 | 4/1995 | Hernandez et al. | 315/219 |

BALLAST CIRCUIT FOR COMPACT FLUORESCENT LAMP

RELATED APPLICATIONS

This application is a continuation of application Ser. No. 08/302,422 filed on Sep. 8, 1994 now abandoned, which is a continuation-in-part of the commonly assigned and copending application entitled FLUORESCENT LAMP APPARATUS WITH INTEGRAL DIMMING CONTROL, Ser. No. 08/217,936, filed Mar. 25, 1994 now abandoned; and is a continuation-in-part of the commonly assigned and copending application entitled FLUORESCENT LAMP APPARATUS WITH INTEGRAL DIMMING CONTROL, Ser. No. 08/237,850, filed May 3, 1994 and still pending. This application is also related to the commonly assigned and application entitled FLUORESCENT LAMP APPARATUS WITH REMOTE DIMMING CONTROL, Ser. No. 08/236,958, filed May 2, 1994 now abandoned. The foregoing applications, and the applications and patents hereinafter set forth, are incorporated herein by reference.

BACKGROUND OF THE INVENTION

This invention relates to electric circuits for operating fluorescent lamps and, more particularly, to ballast circuits for compact fluorescent lamps.

One conventional type of lighting device is the incandescent lamp or bulb. Incandescent lights typically include an enclosed housing having an inner chamber. A tungsten filament mounts within the chamber and extends between a pair of electrical conductors. Electrical energy heats the tungsten filament to a selected elevated temperature, and the heated filament emits visible light. One drawback of incandescent lights is that they are electrically inefficient, have a relatively short useful life, and produce relatively high amounts of heat. Thus, the lights are, power wise, relatively inefficient.

Another conventional type of lighting device is the fluorescent lamp. Typical fluorescent lamps are gas discharge devices which provide illumination as a result of atomic excitation of a low-pressure gas, such as mercury, within the lamp envelope. The excited mercury atoms emit invisible ultraviolet radiation which is converted to visible light as a result of excitation by the mercury atoms of a fluorescent material, e.g., phosphor, that is deposited on the inside surface of the lamp envelope. The fluorescent coating material can be selected to emit visible radiation over a wide spectrum of colors and intensities.

The mercury vapor atoms contained within the fluorescent lamp are excited by means of a pair of arc electrodes mounted in the lamp. The lamp is ignited and operated at a relatively high voltage, and at a relatively constant current. A ballast circuit is commonly disposed in electrical communication with the lamp to start the lamp, and to operate it at the elevated voltage level and constant current required for fluorescent illumination.

Fluorescent lamps are more energy efficient than incandescent light sources, for example, a 40 watt fluorescent bulb produces more light than a 150 watt incandescent bulb, produce far less heat, and consumes less energy over the useful life of the fluorescent lamp.

Numerous ballast circuits for fluorescent lamps exist and are known. Typical ballast circuits electrically connect the fluorescent lamp to power transmission lines, while concomitantly operating the lamp at the necessary current and voltage levels. Some prior art magnetic ballast circuits interpose a large ferrite core inductor between the lamp and the input power source. The inductor provides a selected degree of electrical isolation between the power input and the lamp, while allowing the ballast circuit to conduct the necessary current levels to the fluorescent lamp. A drawback of these conventional ballasts are that they are relatively large and relatively electrically inefficient.

One prior solution was to employ an electronic ballast circuit, which electrically is more efficient. However, these ballast circuits require several active stages to power the fluorescent lamp, to provide any necessary power factor and harmonic distortion correction, and to perform dimming, when desired.

Prior ballast circuits also include dimming controls for variably adjusting the level of brightness of the fluorescent lamp. Some conventional dimming controls employ phase controllers which provide phase controlled voltage to the fluorescent lamp through a resonant circuit. A problem with this approach is that it is relatively difficult to achieve a full dimming range, e.g., from 100% light output to 0% light output. Another problem with these dimmers is the occurrence of striations, e.g., alternating bands of light and dark, which typically occur at relatively low light levels.

Due to the foregoing and other shortcomings of solid state electronic ballast circuits for fluorescent lamps, an object of this invention is to provide a ballast circuit that employs only a single active stage to both power the lamp and to provide the necessary power factor correction.

Another object of this invention is to provide a solid state electronic ballast circuit that has relatively high electrical efficiency.

Still another object of the invention is to provide a ballast circuit for mounting within a compact dimmable fluorescent lamp that is relatively low cost, has relatively few electrical components, and is relatively easy to manufacture.

Yet another object of the invention is to provide a ballast circuit that has relatively low total harmonic distortion and has relatively high power factor correction.

Other general and more specific objects of the invention will in part be obvious and will in part appear from the drawings and description which follow.

SUMMARY OF THE INVENTION

This invention attains the foregoing and other objects with a compact dimmable fluorescent lamp apparatus that connects with at least one fluorescent lamp and with an input power source that supplies an AC input voltage. The lamp includes a rectification stage for rectifying the AC input voltage, a dimming stage for generating a dimming signal indicative of lamp brightness, and a ballast circuit that is in electrical communication with the rectification stage and the dimming stage. The ballast circuit, in one aspect, is arranged for connection with the lamp for applying power variably to the lamp. According to another aspect of the invention, the ballast circuit includes a resonant circuit stage that electrically connects with the lamp and that generates a high frequency voltage in response to the input voltage. The resonant circuit varies the level of power supplied to the lamp in response to the dimming signal, thereby attaining a selected level of lamp brightness.

The ballast circuit further includes a voltage feedback element, in electrical communication with the resonant circuit stage and the rectification stage, for generating a selected high frequency voltage signal and for applying this signal to the rectification means. According to one practice of the invention, the feedback element superimposes the high frequency voltage signal over the input voltage.

According to another aspect, the rectification stage includes at least first and second diodes and at least first and second storage capacitors in circuit with the diodes. In another aspect, the resonant circuit stage includes a series resonant circuit that has a dc filtering element for filtering dc voltage components from the high frequency voltage, and a lamp striking element for selectively actuating the fluorescent lamp. The dc filtering element preferably includes a capacitive element and the lamp striking element, connected electrically in parallel with the lamp, preferably includes a voltage storage capacitor.

According to another aspect, the ballast circuit includes at least first and second semiconductor switching elements for alternately conducting selected portions of the AC input voltage during operation of the lamp.

According to still another aspect, the dimming stage includes a third transistor, a manually variable resistance element, and a storage capacitive element. The manually variable resistor selectively determines the relative brightness level of the lamp. According to another practice of the invention, the capacitive element is responsive to the manually variable resistance element and controls the conduction state of the third transistor. In another practice of the invention, the first and second switching elements have a normal conduction interval, and the third transistor is adapted selectively to terminate the conduction of one of the first and second transistors prior to the normal conduction interval. The dimming stage further includes a circuit by-pass element for electrically by-passing the variable resistor during start-up operation of the lamp.

In still another aspect, the lamp apparatus includes a filter stage for filtering high frequency noise components generated by the resonant circuit to prevent leakage of noise into the input power source, as well as for filtering electromagnetic interference from the input voltage.

In yet another aspect, the voltage feedback element comprises a capacitive element for storing a selected elevated voltage level at least substantially equal to the input voltage. According to another practice of the invention, the voltage feedback element expands the conduction angle of the diodes, as well as provide power factor correction of the input voltage.

This invention further attains a compact fluorescent lamp apparatus for connection to a sinusoidal input voltage and one or more fluorescent lamps that includes a rectification stage, a voltage amplification stage, and a ballast circuit. The rectification stage generates a rectified voltage responsive to the input voltage, and the voltage amplification stage amplifies the rectified voltage. In one aspect, the ballast circuit is in circuit with the rectification stage and the voltage amplification stage, and is further arranged for connection with the lamp for applying power variably thereto. The ballast circuit includes a resonant circuit stage for generating a high frequency voltage in response to the rectified voltage, and a voltage feedback stage. The voltage feedback stage generates a selected high frequency voltage signal that is superimposed over the input voltage. According to another aspect, the voltage feedback stage includes a capacitive element for storing a selected voltage level at least substantially equal to the input voltage.

According to another aspect, the fluorescent lamp includes a dimming stage for generating a dimming signal indicative of a selected level of lamp brightness. According to one practice of the invention, the resonant circuit stage varies the level of power supplied to the lamp in response to the dimming signal for attaining a selected level of lamp brightness. The dimming stage includes, in another aspect, a third transistor, a manually variable resistive element, and at least one capacitive element. The manually variable resistor selectively determines the voltage stored within the capacitive element, which in turn controls the relative conduction state of the third transistor.

According to a further aspect, the resonant circuit is a series resonant circuit that includes a dc filtering element for filtering dc voltage components from the high frequency voltage, and a lamp striking element for actuating the fluorescent lamp.

In still another aspect, the ballast circuit includes at least first and second semiconductor switching elements for alternately conducting during selected portions of the AC input voltage during operation of the lamp. The first and second switching elements have a normal conduction interval, and the third transistor is adapted selectively to terminate the conduction of one of the first and second transistors prior to its normal conduction interval.

According to further aspects of the invention, the rectification stage includes first and second diodes having an associated conduction angle, and the voltage feedback stage expands the conduction angle of at least one of the first and second diodes, and corrects the power factor of the input voltage.

This invention further attains a ballast circuit for connection with a dimmable or non-dimmable compact fluorescent lamp that mounts one or more fluorescent lamps. The ballast circuit includes a rectification stage for rectifying the input voltage, and first and second semiconductor switching elements each having a selected normal conduction interval such that the normal conduction interval of the first switching means is substantially opposite to that of the second switching means. The ballast circuit further includes a series resonant circuit in circuit with the rectification means and the first and second switching elements for generating a high frequency voltage in response to the input voltage.

According to one aspect, the ballast circuit includes a voltage feedback stage in circuit with the resonant circuit for feeding back to the rectification stage a selected high frequency voltage that is at least substantially equal to the input voltage. The ballast circuit also includes a circuit starter stage for selectively actuating one of said first and second switching elements.

According to another aspect, the ballast circuit includes a voltage amplification stage for amplifying the rectified voltage, and a filter stage, in circuit with the rectification stage, for filtering electromagnetic interference from the input voltage.

According to further aspects, the ballast circuit includes a dimming control stage when local dimming of the compact fluorescent is desired. However, the dimming control stage components may also be employed in non-dimmable compact lamps. The dimming control stage adjusts the overall brightness level of the lamp. According to one practice of the invention, the dimming control stage includes a transistor and a manually variable resistive element for adjusting variably the lamp brightness level. The transistor is adapted to terminate selectively the normal conduction interval of one of the first and second switching elements to selectively decrease power supplied to the lamp, thereby adjusting the lamp brightness level.

The fluorescent lamp apparatus thus attains a dimmable or non-dimmable lamp that has a relatively low piece count, and that is relatively low cost. The lamp further attains a lamp that has relatively low total harmonic distortion while providing relatively high power factor correction.

These and other aspects of the invention are evident in the drawings and in the description which follows.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENTS

Figure 1:
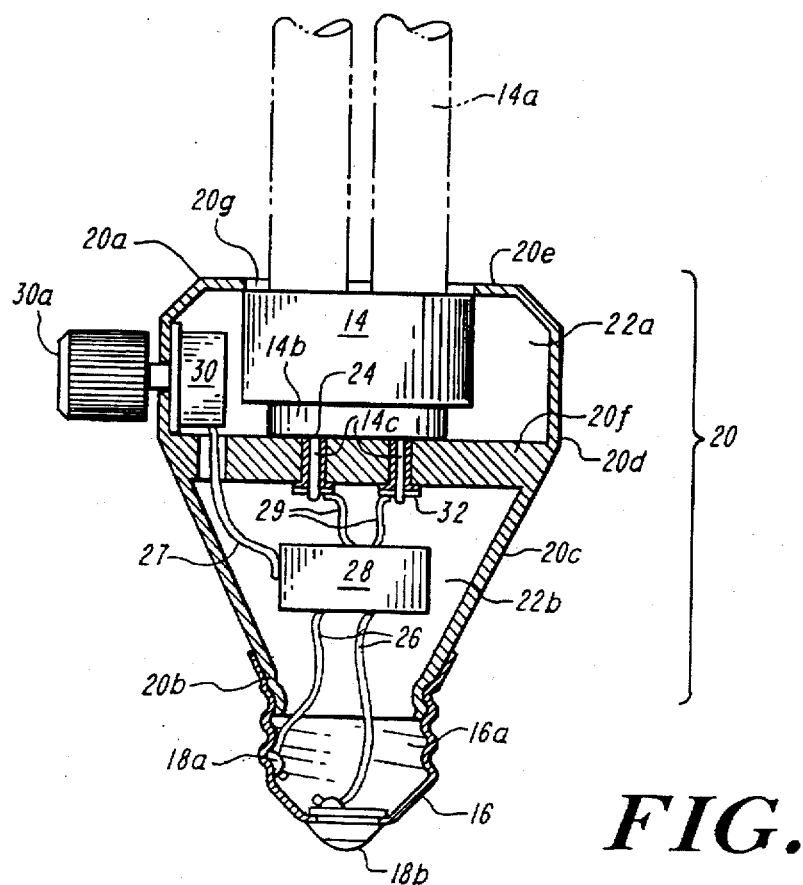
FIG. 1 is a side elevation view, partly in section, of a dimmable compact lamp apparatus that houses the ballast circuit of the present invention.
Figure 2:
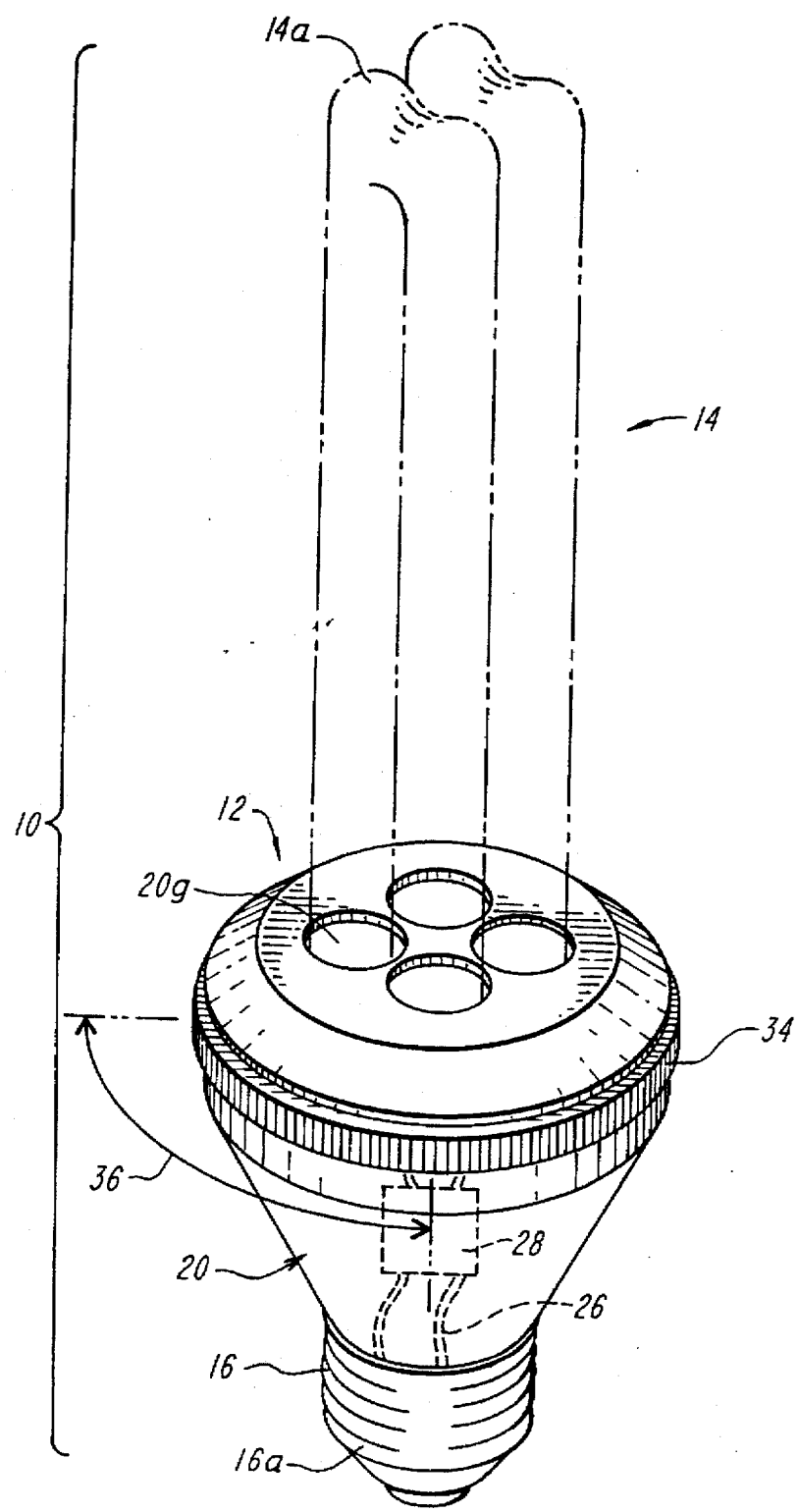
FIG. 2 is a perspective view of a dimmable lamp apparatus according to another embodiment.

This invention provides a compact fluorescent lamp having a lamp-supporting housing that mounts a ballast circuit that is adaptable for local and remote dimming. According to one practice, the housing mounts a manually accessible and rotatable dimming control when the ballast circuit is configured for local dimming. Alternatively, according to another practice, the housing mounts a remotely dimmable ballast circuit that is in electrical communication with a conventional two-wire remote dimmer. The specifics of the lamp-supporting housing are set forth below FIGS. 1 and 2 show a compact dimmable lamp 10 having a lamp adapter 12 that is fitted with a fluorescent lamp element 14. The lamp adapter 12 has a conventional electrical socket base 16 which includes threads 16a for threaded engagement with a conventional electrical lamp socket. The electrical socket base typically includes two electrical conductors 18a and 18b arranged for electrical connection with corresponding conductors on the electrical lamp socket. As conventional, the electrical conductors 18a and 18b are located at the side and the bottom, respectively, of the socket base 16.

The adapter 12 further includes an electrically insulative housing 20 having a top end 20a axially spaced from a bottom end 20b, FIG. 1. The illustrated housing 20 has a generally overall conical or triangular shape which is narrow at the bottom end 20b and wider at the top end 20a. The housing includes funnel-like portion 20c above the bottom end 20b and below a tubular portion 20d, and the housing can have any practical cross-sectional shape, such as, for example, circular, ellipsoid, rectangular or triangular. The illustrated tubular portion 20d has a cylindrical wall and is bounded at the top by flat wall 20e and at the bottom by an interior panel 20f. The housing 20 thus bounds a hollow interior space 22 partitioned into an upper interior space 22a and a lower interior space 22b by the interior panel 20f, which spans the interior space 22 transverse to the longitudinal axis of the housing. The socket base 16 is secured to the housing 20 at the bottom end 20b of the housing to form the bottom of the adapter 12.

In an alternative embodiment of the present invention, the dimmable lamp apparatus includes a removable and replaceable fluorescent illumination element 14, FIG. 2. The illumination element removably and replaceably plugs into a socket-like lamp supporting element comprising interior panel 20f with socket connectors 32. The base portion 14b of the illumination element 14 seats on the top face of panel 20f and fits within openings 20g in the top wall 20e, as shown in FIGS. 1 and 2. Electrical contacts 14c extend through the openings 24 in the panel 20f to removably and replaceably plug into conductive socket connectors 32, thereby forming electrical connection between the illumination element 14 and the adapter 12.

A controllable circuit 28, e.g., a ballast circuit, as described in great detail below, is mounted within the housing 20, illustratively in the lower interior space 22b, FIG. 1 (and shown in phantom in FIG. 2). Input electrical conductors 26 of the control circuit 28 connect respectively to the electrical conductors 18a and 18b of the base. The controllable circuit 28 applies an adjustable variable operating electrical excitation to the illumination element 14 in response to a controllable electrical signal.

With further reference to FIG. 1, the adapter 10 includes an electrical adjustment element 30, such as a variable resistor, which has a manually adjustable knob element 30a. The adjustment element 30, which electrically connects with the controllable circuit 28 via conductor 27, produces a controllable electrical signal in response to adjustment of the position of the adjustment element 30. The adjustment element 30 is preferably manually accessible on the exterior of the tubular portion 20d of the housing 20. The illustrated adjustment element 30a is a knob rotatable about an axis transverse to the longitudinal housing axis. A preferred electrical adjustment element 30 includes, for example, a plurality of gears within the housing 20 which engage with the shaft of the electrical adjustment element and with the shaft of a variable resistor.

In an alternate embodiment, FIG. 2, the adapter 12 includes a dimmer control 34 that extends about at least part of an outer circumference of the housing, rather than the rotatable knob 30a. The dimmer control 34 is rotatably movable relative to the housing 20 about the housing longitudinal axis, as indicated with an arrow 36 extending along the direction of the rotational movement. The dimmer control is mechanically linked to the adjustment element 30 within the housing 20 in a manner similar to that previously described in relation to knob 30a. The illustrated dimmer control 34 encircles the housing tubular portion 20d to be accessible from any direction for manual adjustment.

Output conductors 29 from the controllable circuit 28 electrically connect to the electrical contacts 14c of the fluorescent illumination element 14 via the socket connections 32.

The lamp apparatus thus described provides dimmable and brightenable fluorescent light with manual adjustment of the knob element 30 on the housing of the lamp. With electrical connection of the lamp to an electrical power source, the illumination element 14 provides variable fluorescent light output according to the position of the adjustable knob element 30, which is electrically connected to the dimming circuit control 28.

Figure 3:
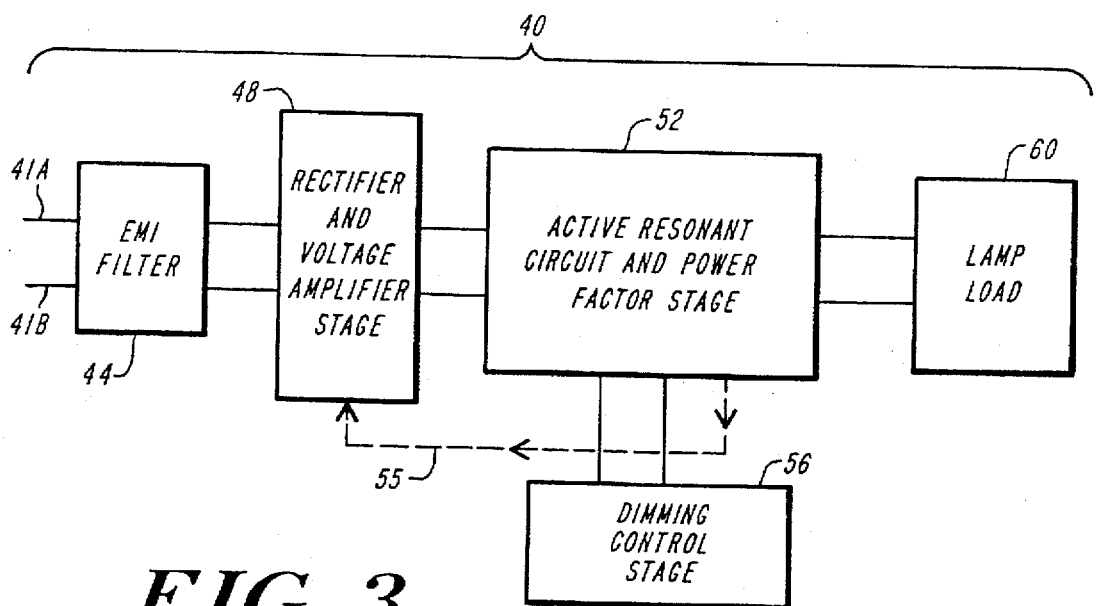
FIG. 3 is a schematic block diagram of a dimmable ballast circuit for use with the compact lamp apparatus of FIG. 1.

FIG. 3 is a block diagram illustration of a fluorescent lamp and ballast circuit 40 in accordance with the present invention. The illustrated ballast circuit 40 can be mounted in the lower interior lamp space 22A within the controllable circuit housing 28, FIG. 2. The lamp load 60 corresponds to the fluorescent tubes 14a, FIG. 1.

The ballast circuit 40 includes an EMI filter stage 44, a rectification and voltage amplification stage 48, a resonant circuit and power factor correction stage 52, a dimming control stage 56, and a lamp load 60, connected as shown.

The input power supply high and low voltage lines 41A and 41B, respectively, are connected electrically in series with the EMI filter stage 44. The output of the EMI filter 44 is connected to the voltage amplification stage 48, which in turn is connected electrically in series with the resonant circuit stage 52. The output of the resonant circuit 52 is connected, powerwise, in series with the lamp load 60. The resonant circuit is also electrically connected to the dimming control stage 56, and is responsive to an output dimming signal produced by the dimming stage 56 for varying the current supplied to the lamp load, as described in detail greater below. The resonant circuit 52 generates a voltage feedback signal 55 that electrically communicates with the voltage amplification stage 48.

Figure 4:
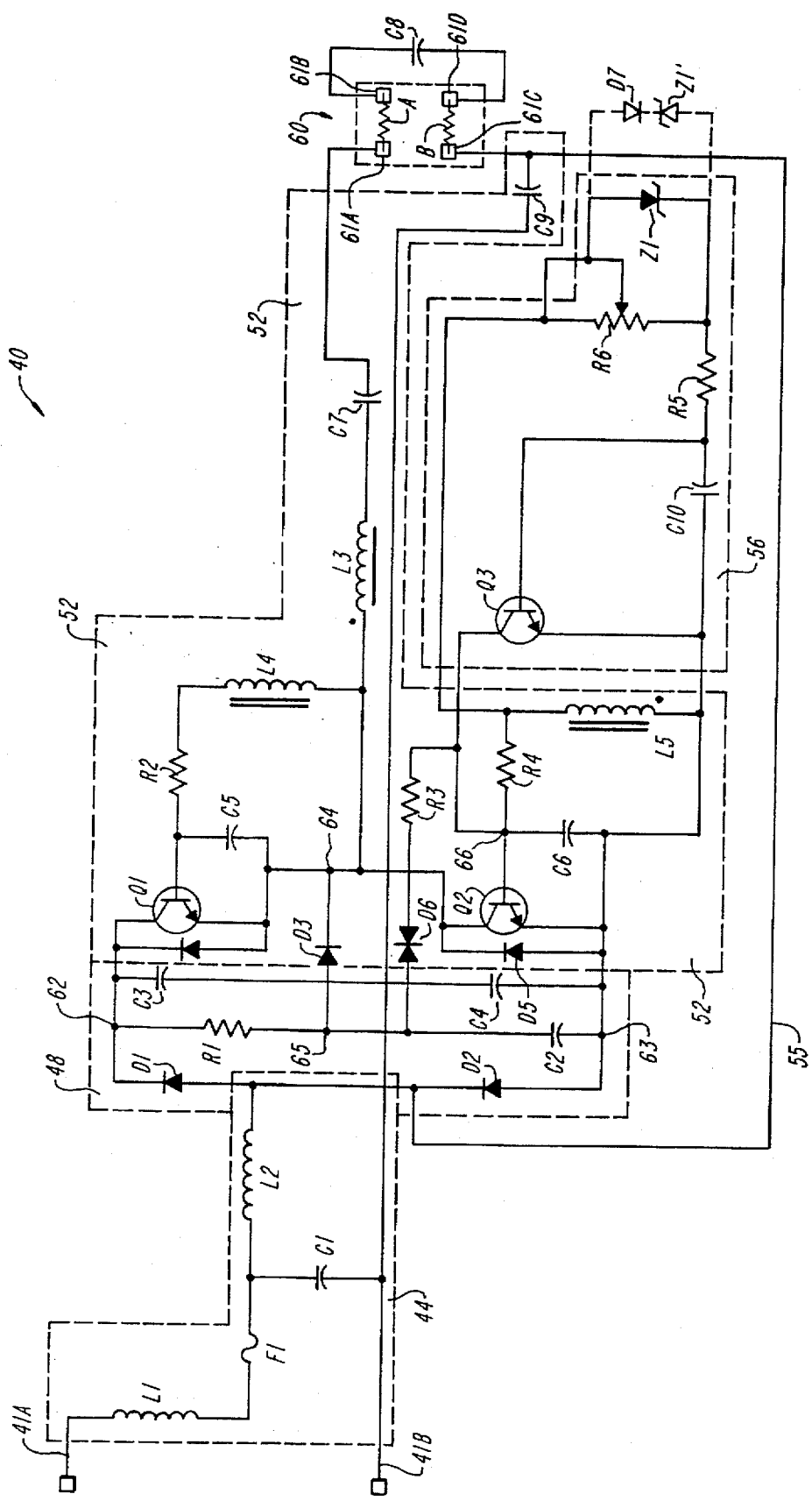
FIG. 4 is a schematic circuit illustration of ballast circuitry of FIG. 3.

FIG. 4 depicts one preferred embodiment of a locally dimmable ballast circuit 40, as schematically shown in block diagrams in FIG. 3. The ballast circuit includes an EMI stage 44 that is connected between the input power leads 41A and 41B. The EMI filter includes a series inductor L1, a fuse F1, a parallel capacitor C1, and a high frequency blocking inductor L2. The inductor L1 is connected electrically in series with the fuse F1, which in turn is connected to one end of the parallel capacitor C1. The opposite end of the capacitor is connected to the low voltage input line 41B—also referred to as the neutral rail. The inductor L1 and capacitor C1 ensure a smooth input waveform by preventing interference with other electronic devices, as is known in the art. The coupled series inductor L2 prevents leakage of unwanted high frequency interference into the power transmission line. The fuse F1 protects the ballast circuit 40 and lamp load 60 from damage due to overcurrents from the overhead power voltage line.

The rectification and voltage amplification stage 48 includes a pair of rectifying diodes D1 and D2, current limiting resistor R1, and storage capacitors C3 and C4. The anode of diode D1 is connected to one end of the high frequency blocking inductor L2 and to the cathode of diode D2. The cathode of diode D1 is connected to one end of resistor R3 and to the charging end of a storage capacitor C3, the opposite end of which is connected to the neutral rail. The anode of diode D2 is connected to one end of storage capacitor C4, the opposite end of which is connected to the rail. The diodes D1 and D2 selectively allow the storage capacitors to charge during portions of each cycle of the sinusoidal input voltage. For example, diode D1 allows capacitor C3 to charge at the peak voltage of the positive half cycle of the input voltage, and diode D2 allows capacitor C4 to charge at the peak voltage of the negative half cycle. The voltage amplification performed by the illustrated amplification stage is two to one.

The current limiting resistor R1 is further connected at one end to a storage capacitor C2, a diac D6, and the anode of a blocking diode D3, at the circuit junction 65. The storage capacitor C2, whose opposite end is connected to the anode of diode D2, the diac D6, and the transistor-driving resistor R3 form a starter circuit that actuates or turns on transistor Q2, as described in greater detail below.

With further reference to FIG. 4, the active resonant stage 52 includes a pair of switching transistors Q1 and Q2, each having a freewheeling diode D4 and D5, respectively, connected between its collector and emitter, and a pair of reverse-breakdown voltage capacitors C5 and C6. The stage further includes a transistor-driving resistor R2, a current limiting resistor R4, a primary inductor L3 and secondary inductors L4 and L5, a dc blocking capacitor C7 and a voltage feedback capacitor C9. The resonant circuit is connected electrically in series with a lamp load 60 that includes output connections 61A, 61B, 61C, and 61D, and voltage storage or lamp striking capacitor C8. Preferably, a lamp filament A is connected between connections 61A and 61B, and a lamp filament B is connected between connections 61C and 61D. The freewheeling diodes provide a current path for the dissipation of magnetic energy stored in the coupled inductors L4 and L5 when transistors Q1 and Q2, respectively, are turned off.

The collector of transistor Q1 is electrically connected to the circuit junction 62, and the emitter is connected to the circuit junction 64. The breakdown capacitor C5 is electrically connected between the transistor base and emitter. The driving resistor R2 is connected in series with the inductor L4. The anode of diode D3 is connected to circuit junction 65, and the cathode is connected to circuit junction 64, and is electrically in series with the series combination of the inductor L3 and the dc blocking capacitor C7. One end of capacitor C7 is connected to the output connection 61A of the lamp load 60, and the storage capacitor C8 is electrically connected between the circuit connections 61B and 61D. The feedback storage capacitor C9 is connected in series between the neutral rail 41B and the lamp connection 61C.

The collector of transistor Q2 is electrically connected to circuit junction 64 and the emitter is electrically connected to circuit junction 63. The base of transistor Q3 is connected to circuit junction 66. The breakdown capacitor C6 is connected between the transistor base and emitter. The base of transistor Q2 is electrically connected in series with resistor R4, the opposite end of which is connected to one end of inductor L5. The opposite end of the inductor L5 is connected to circuit junction 63.

With further reference to FIG. 4, the illustrated ballast circuit 40 is energized by the application of a sinusoidal input voltage having a selected magnitude and frequency, i.e., 120 volts AC at 60 Hz, to the input power lines 41A and 41B. The input voltage is filtered by the filter stage 44 and produces an input current flow through diode D1 and resistor R1, and through the series combination of diode D3, inductor L3, and capacitors C7, C8 and C9, during each positive half-cycle. During each negative half cycle, current flows through diode D2 and capacitor C2, and through the above series combination. Concomitantly, each storage capacitor C3 and C4 charges during the peak portion of each corresponding half cycle, and discharges during the other half cycle. For example, capacitor C3 charges during the positive half cycle of the input line voltage, and discharges through resistor R1 during the negative half cycle.

The inductor L3 stores energy and along with capacitors C7, C8 and C9, define a series resonant circuit. These components produce a current having a selected elevated frequency, preferably greater than 20 KHz, and most preferably around 40 KHz, during normal operation of the ballast circuit. This high frequency operation reduces hum and other like electrical noise. Additionally, high frequency operation of the lamp reduces the occurrence of annoying flickering of the lamp, especially during dimming.

The resonating storage capacitor C8 stores a selected elevated voltage, preferably equal to or greater than 300 volts RMS, which is required to start the fluorescent lamps mounted at lamp connections 61A–61D. Once the lamps are struck, the circuit operating voltage is reduced to a value slightly greater than the input voltage, preferably around 100 volts RMS, and which is maintained by the storage and feedback capacitor C9.

Again referring to FIG. 4, the switching transistor Q2 is actuated by the starter circuit. Specifically, when capacitor C2 charges to a voltage greater than the diac reverse break-down voltage D6, the diac D6 discharges through the driving-resistor R3, turning on transistor Q2. Once transistor Q2 is turned on, the switching transistors Q1 and Q2 alternately conduct during each half cycle of the input voltage, and are driven during normal circuit operation by energy stored in inductor L3. In a preferred embodiment, inductors L4 and L5 are different windings on the core of inductor L3. Thus, inductor L3 is magnetically coupled to both inductors L4 and L5. The illustrated inductors L4 and L5 are preferably oppositely poled and thus are driven out of phase relative to each other. More specifically, inductor L4 generates the driving voltage for transistor Q1 during the positive half cycle of the input voltage, and inductor L5 generates the driving voltage for transistor Q2 during the negative half cycle. The capacitor C2 discharges through diode D3 after each cycle of the input voltage.

The capacitor C9 operates both as a dc blocking capacitor for preventing the passage of unwanted dc voltage along the neutral rail 41B, and as a feedback capacitor for feeding back a selected high frequency voltage level to the input of the voltage amplification stage 48. As previously stated, the voltage drop across the capacitor C9 is preferably in the range of the input voltage, and most preferably is greater than the input voltage value. This elevated feedback voltage expands the conduction angle of the diodes D1 and D2, essentially forcing them to conduct during nearly the entire portion of each voltage cycle, thereby compensating for the non-linearities of the diodes. The high frequency voltage, supplied by the feedback capacitor modulates the amplitude of the low frequency input voltage, which in turn functions as a carrier to transport the high frequency current over substantially the entire low frequency cycle, e.g., 60 Hz.

This feedback topology produces an essentially linear, e.g., resistive, load at the input voltage interface of the ballast circuit 40, e.g., at the cathode of diode D2, significantly improving the total harmonic distortion and power factor performance of the ballast circuit 40. As is known, the active power factor correction capacitor C9 ensures a relatively clean, e.g., correct, sinusoidal input voltage waveform suitable for operating one or more fluorescent lamps. Correcting distortions of the input voltage waveform protects the lamp from damage by transient signal perturbations, as well as control current distortions that arise from the non-corrected input voltage. The illustrated ballast circuit 40 achieves significant power factor correction, in the range of 95%, by employing the illustrated feedback topology.

The illustrated ballast circuit with the power factor correction capacitor C9 also significantly reduces the total harmonic distortion of the lamp by dampening amplified higher order frequency harmonics present in the ballast circuit from uncorrected input voltage.

Typically, series resonant circuits tend to amplify higher order harmonics since the series resonant capacitor resonates with the inductance of the power line conductor creating a ringing effect that amplifies these higher order harmonics. The power factor correction capacitor corrects the waveform of the AC input voltage and harmonizes the phases of the resonant circuit current and the input current. Thus, the ballast circuit operates at relatively low total harmonic distortion while having relatively high power factor correction.

The dimming stage 56, FIG. 4, includes a transistor Q3, storage capacitor C10, resistor R5, variable resistor R6, and zener diode Z1. Although shown as part of the resonant circuit 52, those of ordinary skill will recognize that the current-limiting resistor R4 and the inductor L5 can be included in a separate dimming stage 56, FIG. 3. The collector of transistor Q3 is electrically connected to circuit junction 66, and the emitter is electrically connected to one end of inductor L5 and to one end of capacitor C6. The capacitor C10 is connected between the base and emitter of transistor Q3, and resistor R5 is connected between one end of the capacitor C10 and the variable resistor R6. The opposite end of resistor R6 is connected to one end of resistor R4, and the zener diode Z1 is connected electrically in parallel with the resistor R6. The capacitor C10 and the resistor R5 form an RC circuit that preferably has a time constant between about 4 μs and about 6 μs.

The illustrated dimming stage 56 adjusts the level of lamp illumination by turning off transistor Q2 for selected portions of the voltage half cycle in which it conducts. In a preferred embodiment, the conduction state of Q3 controls the conduction state of transistor Q2. Specifically, when transistor Q3 conducts, Q2 turns off and, conversely, when transistor Q3 is turned off, transistor Q2 conducts.

The variable resistor R6 controls the conduction state of transistor Q3 by varying the voltage drop across capacitor C10. According to one practice, when the dimming stage total dimming resistance, defined as the cumulative resistance of resistor R5 and variable resistor R6, is relatively high, defined as minimum dim condition, the voltage drop across capacitor C10 is insufficient to turn on transistor Q3. In this state, transistor Q2 continues to conduct uninterrupted during its selected portion of the input voltage cycle, and maximum current is supplied to the lamp load 60 to produce maximum lamp illumination. When the cumulative dimming resistance is relatively low by manually adjusting the variable resistor to define a lower resistance, the voltage drop across capacitor C10 increases and turns on transistor Q3, which then turns off transistor Q2 during some selected portion of its half cycle. Specifically, the total dimming resistance as defined by the variable resistor R6 determines the specific portion of the half cycle in which Q2 conducts. This, in turn, determines the amount of lamp-driving current that is supplied to the load, and thus determines the lamp illumination level.

Figure 5:
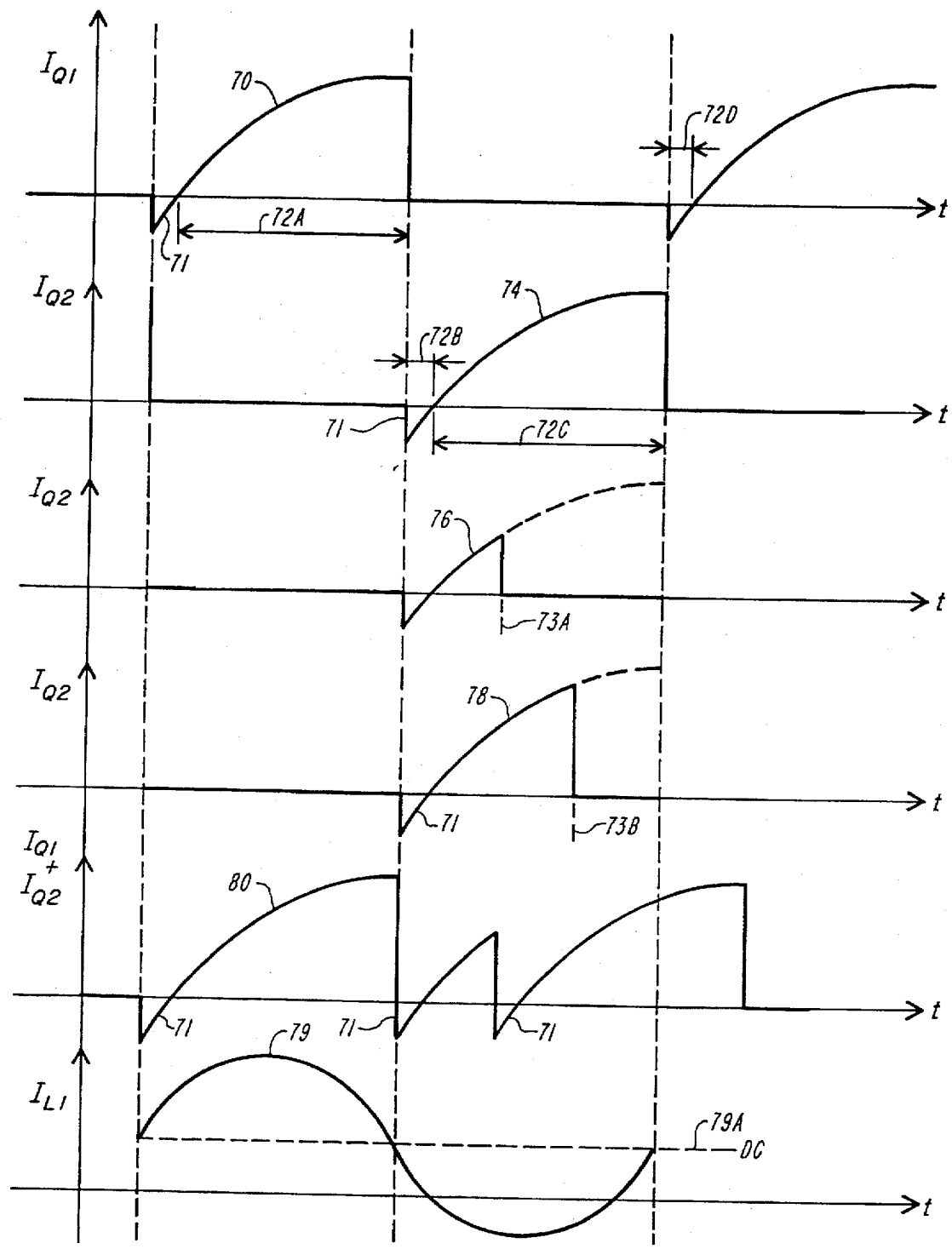
FIG. 5 graphically illustrates the current waveforms of selected electrical components of FIG. 4.

FIG. 5 illustrates the theoretical current waveforms at the collectors of transistors Q1 and Q2 during operation of the dimming circuit 56. Dashed lines are provided to illustrate the operation of the transistors during selected portions of each half cycle of the circuit AC current. Waveform 70 shows the theoretical collector current of transistor Q1 during normal operation of the ballast circuit 40. The transistor collector current is substantially identical during both dim and non-dim conditions since the conduction of transistor Q1 is substantially uninterrupted during its normal conduction interval. Likewise, waveform 74 shows the theoretical current through the collector of transistor Q2. As shown, transistors Q1 and Q2 conduct during opposite half cycle portions of the sinusoidal circuit current. The negative current values, shown as triangular downward spikes, denote the period when both transistors Q1 and Q2 are turned off. However, each freewheeling diode D4 and D5 conducts current when its respective transistor is turned off, thus maintaining a circuit pathway for the flow of the coupled inductive current during this time period. As shown in the illustrated waveforms 70 and 74, the sequence of current flow through the transistors Q1 and Q2 and the freewheeling diodes D4 and D5 is as follows: current flows from the emitter of transistor Q1 for a selected period 72A; current flows through the freewheeling diode D4 for a selected period 72B with transistor Q1 turned off; current flows from the emitter of transistor Q2 for a selected period 72C; and finally current flows through the freewheeling diode D5 for a selected period 72D with transistor Q2 turned on.

Waveforms 76 and 78 show that conduction of transistor Q3 prematurely turns off transistor Q2 for selected portions of its normal conduction interval. Waveform 76 shows the current waveform of transistor Q2 with its conduction interval interrupted at a first selected location 73A. Similarly, waveform 78 shows the current waveform of transistor Q2 with its normal conduction interval interrupted at a second selected location 73B. A representative combined current waveform 80 of transistors Q1 and Q2 with the normal conduction interval of transistor Q2 prematurely terminated illustrates that the duty cycle of the sinusoidal circuit is adjusted variably by the variable resistor R6. This shifted current waveform produces an additional dc current component in the ballast circuit during operation. For example, the current waveform 79 of inductor L1 shows the alternating current passing through the inductor during dimming. The compressed conduction cycle of the transistors Q1 and Q2 produces a vertical shift in the current waveform, which corresponds to an additional dc current component 79A. This dc current component 79A is filtered from the resonant circuit current by the dc blocking capacitor C7. The excess charge that develops across capacitor C7 reduces the overall operating voltage of the ballast circuit, and thus reduces the level of current supplied to the lamp. Consequently, the resistor R6 controls the relative level of lamp brightness.

With further reference to FIG. 4, the zener diode Z1, which is disposed in parallel with the variable resistor R6, ensures proper start-up operation of the fluorescent lamp by forcing the ballast circuit 40 to initially operate in maximum dimming conditions, e.g., minimum total dimming resistance. This condition exposes the fluorescent lamp filaments to an appropriately high voltage level. As described above, during start-up operations the ballast circuit 40 is exposed to a voltage level that is approximately three times that of the input voltage level, e.g., about 300 volts RMS. This voltage is applied to the dimming circuit 56 by inductor L3 through the magnetically coupled inductor L5. The inductor L5 provides power to transistors Q2 and Q3 and to the associated electronic circuit components. The elevated voltage level forces the zener diode Z1 to operate in its reverse breakdown region, thus temporarily by-passing the variable resistor R6. Consequently, the dimming circuit 56 operates during start-up with minimum resistance for maximum dimming. This topology allows the ballast circuit to accumulate high voltage levels across the lamp filaments and at the storage capacitor C8, for subsequent striking of the lamp. Once the lamp is struck and the ballast circuit operates at the substantially reduced circuit running voltage, the zener diode Z1 stops conducting, and variable resistor R6 is again electrically associated with the dimming circuit.

In another embodiment of the dimming circuit 56, shown in phantom in FIG. 4, a diode D7 can be placed electrically in series opposition with zener diode Z1'. For example, the anode of the diode is connected to the anode of the zener diode Z1. The diode D7 prevents an excessive negative charge from accumulating on capacitor C10 during normal circuit running conditions, thereby preventing base-emitter breakdown in transistor Q3. The remaining operation of the dimming circuit 56 operates substantially as described above.

A significant feature of the ballast circuit 40 of the present invention is that it requires only a single active stage to perform all the necessary functions of a ballast circuit, including lamp start-up and lamp driving operations, and local dimming of the lamp. The illustrative circuit further provides for low total harmonic distortion and high power factor correction, for example, greater than 95%. The stream-lined circuit design of FIG. 4 also provides for high electrical efficiency of the operating circuit because of the lack of additional necessary and parasitic active stages.

The illustrated circuit of FIG. 4 can further be utilized with a non-dimmable fluorescent lamp by replacing the variable resistor R6 with a fixed resistor. The value of the fixed resistor preferably continually biases transistor Q3 off, allowing the application of maximum power to the fluorescent lamp. Alternatively, the entire dimming stage 56 can be removed to reduce the overall cost of the ballast circuit.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall there between.

Having described the invention, what is claimed as new and desired to be secured by Letters Patent is:

1. In compact dimmable fluorescent lamp apparatus for connection with at least one fluorescent lamp and with an input power source supplying an AC input voltage, the improvement comprising rectification means for rectifying said AC input voltage, dimming means for generating a dimming signal indicative of lamp brightness, and ballast circuit means in circuit with said rectification means and said dimming means, and arranged for connection with the lamp for applying power variably to the lamp, said ballast circuit means including resonant circuit means for electrical connection with the lamp, said resonant circuit means generating a high frequency voltage in response to said input voltage, and further varying the level of power supplied to the lamp in response to said dimming signal, thereby attaining a selected level of lamp brightness, and voltage feedback means electrically in series with the lamp and in electrical communication with said resonant circuit means and with said rectification means, for generating a selected high frequency voltage signal and for applying said voltage signal to said rectification means, whereby said high frequency voltage signal is superimposed over said AC input voltage.

2. In compact dimmable fluorescent lamp apparatus according to claim 1, the further improvement wherein said rectification means further comprises voltage amplification means for selectively amplifying said input voltage.

3. In compact dimmable fluorescent lamp apparatus according to claim 2, the further improvement wherein said rectification means includes at least first and second diodes and at least first and second storage capacitors in circuit with said diodes.

4. In compact dimmable fluorescent lamp apparatus according to claim 1, the further improvement wherein said resonant circuit means is a series resonant circuit.

5. In compact dimmable fluorescent lamp apparatus according to claim 1, the further improvement wherein said resonant circuit means comprises dc filtering means for filtering dc voltage components from said high frequency voltage, and lamp striking means for selectively actuating said fluorescent lamp.

6. In compact dimmable fluorescent lamp apparatus according to claim 5, the further improvement wherein said dc filtering means includes a capacitive element, and wherein said lamp striking means is connected electrically in parallel with the lamp and includes a voltage storage capacitor.

7. In compact dimmable fluorescent lamp apparatus according to claim 1, the further improvement wherein said ballast circuit further includes at least first and second semiconductor switching elements for alternately conducting selected portions of said AC input voltage during operation of the lamp.

8. In compact dimmable fluorescent lamp apparatus according to claim 7, the further improvement wherein said dimming means includes a third transistor, a manually variable resistance element, and a storage capacitive element, said manually variable resistor selectively determining the illumination brightness level of said lamp.

9. In compact dimmable fluorescent lamp apparatus according to claim 8, the further improvement wherein said capacitive element is responsive to said manually variable resistance element for controlling conduction of said third transistor.

10. In compact dimmable fluorescent lamp apparatus according to claim 9, the further improvement wherein each said first and second switching elements have a normal conduction interval, and wherein said third transistor is adapted selectively to terminate said conduction of one of said first and second transistors prior to said normal conduction interval.

11. In compact dimmable fluorescent lamp apparatus according to claim 1 the further improvement comprising filter means for filtering high frequency noise components generated by said resonant circuit to prevent leakage of said noise into said input power source, and for filtering electromagnetic interference from said input power source.

12. In compact dimmable fluorescent lamp apparatus according to claim 8, the further improvement wherein said dimming means further comprises circuit by-pass means for electrically by-passing said variable resistor during start-up operation of said lamp.

13. In compact dimmable fluorescent lamp apparatus according to claim 12, the further improvement the further improvement wherein said circuit by-pass means comprises a zener diode.

14. In compact dimmable fluorescent lamp apparatus according to claim 1, the further improvement wherein said voltage feedback means comprises a capacitive element for storing a selected voltage level at least substantially equal to said input voltage.

15. In compact dimmable fluorescent lamp apparatus according to claim 3, the further improvement wherein said voltage feedback means further includes conduction angle expansion means for expanding the conduction angle of said diodes.

16. In compact dimmable fluorescent lamp apparatus according to claim 1, the further improvement wherein said voltage feedback means further comprises power factor correction means for correcting said power factor of said input voltage.

17. Fluorescent lamp apparatus for connection to an AC input voltage and to at least one fluorescent lamp, said lamp apparatus comprising rectification means for generating a rectified voltage responsive to said AC input voltage, voltage amplification means for amplifying said rectified voltage, and ballast circuit means in circuit with said rectification means and said voltage amplification means and arranged for connection with the lamp for applying power variably thereto, said ballast circuit means including resonant circuit means for generating a high frequency voltage in response to said rectified voltage, and voltage feedback means, in electrical communication with said resonant circuit means and said rectification means, for generating a selected high frequency voltage signal, whereby said high frequency voltage signal is superimposed over said AC input voltage.

18. Fluorescent lamp apparatus according to claim 17 further including dimming means for generating a dimming signal indicative of a selected level of lamp brightness, and wherein said resonant circuit means, in circuit with said dimming means, varies the level of power supplied to the lamp in response to said dimming signal for attaining a selected level of lamp brightness.

19. Fluorescent lamp apparatus according to claim 17 wherein said resonant circuit means is a series resonant circuit.

20. Fluorescent lamp apparatus according to claim 17 wherein said resonant circuit means comprises dc filtering means for filtering dc voltage components from said high frequency voltage, and lamp striking means for actuating the fluorescent lamp.

21. Fluorescent lamp apparatus according to claim 18, wherein said ballast circuit further includes at least first and second semiconductor switching elements for alternately conducting during selected portions of said AC input voltage during operation of the lamp.

22. Fluorescent lamp apparatus according to claim 21, wherein said dimming means includes a third transistor, a manually variable resistive element, and at least one capacitive element, said manually variable resistor determining selectively the voltage stored within said capacitive element, which in turn controls the relative conduction state of said third transistor.

23. Fluorescent lamp apparatus according to claim 22, wherein each said first and second switching elements have a normal conduction interval, and wherein said third transistor is adapted selectively to terminate said conduction of one of said first and second transistors prior to said normal conduction interval.

24. Fluorescent lamp apparatus according to claim 17, wherein said voltage feedback means comprises a capacitive element for storing a selected voltage level at least substantially equal to said input voltage.

25. Fluorescent lamp apparatus according to claim 17, wherein said rectification means includes first and second diodes having an associated conduction angle, and wherein said voltage feedback means further includes conduction angle expansion means for expanding the conduction angle of at least one of said first and second diodes.

26. Fluorescent lamp apparatus according to claim 17, wherein said voltage feedback means further comprises power factor correction means for correcting said power factor of said input voltage.

27. Ballast circuit apparatus for connection with a dimmable compact fluorescent lamp mounting one or more fluorescent lamps and for connection with an AC input voltage, said circuit apparatus comprising rectification means for rectifying said AC input voltage, first and second semiconductor switching means in electrical communication with said rectification means and each having a selected normal conduction interval, wherein said normal conduction interval of said first switching means is substantially opposite to that of said second switching means, a series resonant circuit in circuit with said rectification means and said first and second switching means for generating a high frequency voltage in response to said input voltage, voltage feedback means in circuit with said resonant circuit for feeding back to said rectification means said selected high frequency voltage at a selected elevated voltage level at least substantially equal to said input voltage, circuit starter means in electrical communication with one of said first and second switching means for selectively actuating said switching means, and dimming control means in electrical communication with at least one of said first and second switching means for adjusting variably said brightness level of the lamp.

28. Ballast circuit apparatus according to claim 27 further comprising voltage amplification means for amplifying said rectified voltage.

29. Ballast circuit apparatus according to claim 27 further comprising filter means in circuit with said input voltage and said rectification means for filtering electromagnetic interference from said input voltage.

30. Ballast circuit apparatus according to claim 27 wherein said dimming control means includes a transistor and a manually variable resistive element for adjusting variably the lamp brightness level.

31. Ballast circuit apparatus according to claim 30 wherein said transistor is adapted to terminate selectively the normal conduction interval of one of said first and second switching means to selectively decrease power supplied to the lamp, thereby adjusting the lamp brightness level.

32. Ballast circuit apparatus according to claim 27 wherein said voltage feedback means is adapted to provide power factor correction of said input voltage.

* * * * *